Sept. 25, 1956

L. U. C. KELLING 2,764,720

FOLLOW-UP CONTROL SYSTEM

Filed May 23, 1955

Inventor:
Leroy U.C. Kelling,
by Irving H. Marshman
His Attorney.

Sept. 25, 1956     L. U. C. KELLING     2,764,720

FOLLOW-UP CONTROL SYSTEM

Filed May 23, 1955     2 Sheets-Sheet 2

Inventor:
Leroy U. C. Kelling,
by Irving H. Marshman
His Attorney.

United States Patent Office 2,764,720
Patented Sept. 25, 1956

2,764,720
FOLLOW-UP CONTROL SYSTEM

Leroy U. C. Kelling, Waynesboro, Va., assignor to General Electric Company, a corporation of New York Application May 23, 1955, Serial No. 510,080

13 Claims. (Cl. 318—30)

This invention relates to control systems, more particularly to follow-up control systems for controlling the driving means to drive an object into positional agreement with a pilot device, and it has for an object the provision of a simple, reliable, efficient and improved control system of this character.

More specifically, the invention relates to follow-up control systems in which the driving means is controlled by an electrical indication of the difference between the actual instantaneous position of the driven object and its desired position. This electrical indication is furnished by means of a director mechanism and a position indicator which is driven by the driving means. Such position indicator comprises a plurality of control devices each connected to the driving means by mechanical driving connections having different ratios. The director comprises a plurality of corresponding control devices. Each control device in the position indicator is electrically connected to its counterpart in the director and each such pair of connected control devices in the director and position indicator constitutes a control system for the driving means. The control system having the lowest ratio driving connection between its control device in the position indicator and the driving means constitutes a low speed or coarse control means whereas a system having a higher ratio driving connection constitutes a high speed or fine control means. Accordingly, a further object of the invention is the provision of improved means for transferring the control of the driving means from either the fine or coarse control means to the other at the boundary between predetermined zones of operation of each. A still more specific object of the invention is the provision of improved means for transferring control of the driving means from a fine control means to a relatively coarse control means when the positional disagreement between the control devices of the fine control is in excess of a predetermined amount and for re-transferring the control to the fine controlling means when the positional disagreement becomes less than such predetermined amount.

Control devices of the character to which reference is made in the foregoing may be either of the direct current type or the alternating current type. The direct current type may be a ring-type potentiometer having a stator member upon which is mounted a resistance element and a rotor member upon which is mounted a contact which makes contact with the resistance element. The alternating current-type control device is usually an induction-type device and is referred to by such terms as selsyn synchro or rotary induction device. It may be either of the rotary or linear type. The rotary type is physically similar to a wound rotor motor in that it has a stator member and a rotor member upon one of which is mounted a primary winding and upon the other of which is mounted a secondary winding. The linear device has relatively movable members, i. e. magnetic structures upon which are mounted primary and secondary windings. However the magnetic structures of the linear device are developed in a straight line or plane instead of the cylindrical or drum form of the rotary device. Consequently, the relative motion of its relatively movable members is straight line in contrast to the rotary motion of the rotary device. The rotary and linear devices are electrically similar and produce similar electrical characteristics and results. In general, they may be used interchangeably in electrical control systems, although in certain applications one may possess advantages over the other. Rotary control devices lend themselves to relatively simple illustration and consequently, in the drawings and in the following specification the director and position and indicator are illustrated as comprising control devices of the rotary induction type.

In carrying the invention into effect in one form thereof, the driving means of a follow-up control system is controlled in response to the positional disagreement or error between a director and a position indicator. The director comprises a plurality of control devices each having relatively movable stator and rotor members and the position indicator also comprises a plurality of control devices each corresponding to a different one in the director and each having relatively movable rotor and stator members. Corresponding control devices of the director and position indicator are electrically connected together and mechanical driving connections of different ratios are provided between the driving means and the movable members of the position indicator control devices thereby to provide for the motor a plurality of control systems of progressively different degrees of refinement of accuracy of control ranging from coarse to fine. A voltage mixing and take-over network of linear and non-linear resistors serves to transfer the control of the driving means from one to the other of a relatively coarse and a relatively fine control system at the boundary between predetermined zones of operation of each. This takeover network comprises a pair of output terminals and a succession of pairs of input terminals. One of the output terminals and one of each pair of input terminals are connected in common. Between each non-common input terminal and the next is connected a variable ratio voltage divider which comprises a linear resistor and a non-linear resistor connected in series. A linear resistance transfer circuit is connected from a tap on the divider to the non-common output terminal.

For a better and more complete understanding of the invention, reference should now be had to the following specification and to the accompanying drawings of which

Figure 1:
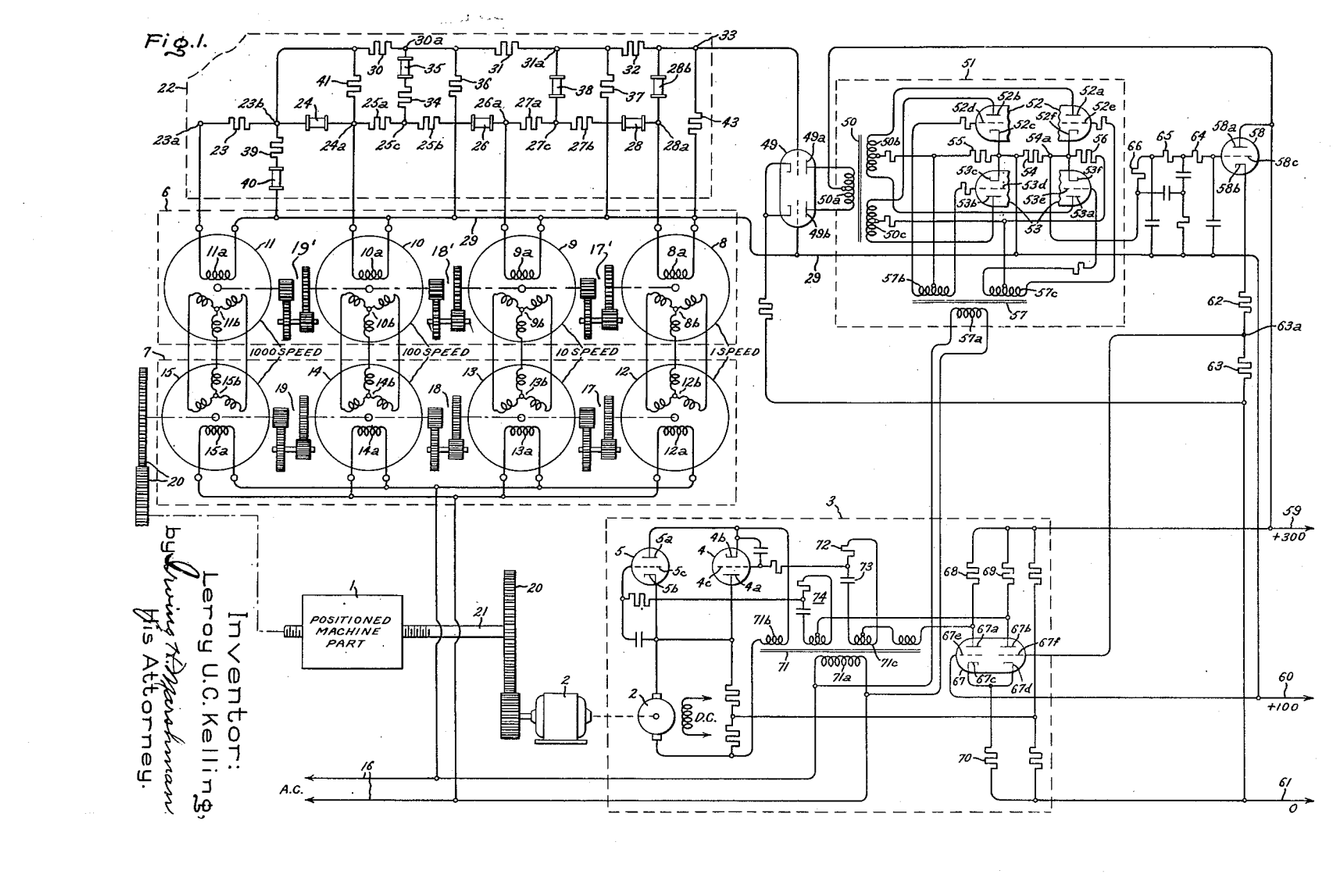
Fig. 1 is a simple diagrammatical sketch of a follow-up control system embodying the invention.

Referring now to the drawing, an object 1 which is to be moved to a desired precise position is driven by suitable driving means which is illustrated as a direct current shunt-type motor 2. The object 1 could be a gun of an ordnance control system, the tool of an automatic profiling control system or any other movable part of a machine tool. For example, it could be the table of a turret punch press and in the following specification it will be referred to as the table.

To the armature of motor 2, direct voltage of correct polarity for the desired direction of rotation is supplied from the output circuit of a thyratron reversing motor control 3. This control comprises a thyratron 4 which, when a direct control voltage of sufficient magnitude is supplied to its input circuit, supplies to the armature of the motor a direct voltage of the appropriate polarity for rotation in the forward direction, and a similar thyratron 5 which, when a direct control voltage of sufficient magnitude is supplied to its input circuit, supplies to the armature of the motor a direct voltage of opposite polarity to effect rotation in the reverse direction.

For the purpose of controlling the supply of such control voltages to the input circuit of the thyratron 4 and 5, a director 6 and a position indicator 7 are provided. The director 6 comprises a plurality of rotary induction devices 8, 9, 10 and 11 and the position indicator comprises an equal number of corresponding rotary induction devices 12, 13, 14 and 15. These rotary induction devices are of similar construction and consequently only rotary induction device 12 which is selected as typical of the others will be described in detail. As shown, it is provided with a single element winding 12a and with a distributed 3-element winding 12b. Either winding may be mounted on the stator member and the other on the rotor member. It is assumed, however, that the single element windings of all the devices in the director and in the position indicator are mounted on the rotor members and that the distributed 3-element windings are mounted on the stator members.

In the position indicator, the single phase windings 12a, 13a, 14a and 15a are supplied from a suitable source of alternating voltage such as the supply lines 16, and consequently they act as primary windings and induce alternating voltages in the secondary windings 12b, 13b, 14b and 15b. The terminals of secondary windings 12b, 13b, 14b and 15b are directly connected to the terminals of corresponding windings 8b, 9b, 10b and 11b respectively of the counterpart rotary induction devices of the director so that the voltages induced in the windings 12b, 13b, 14b and 15b are supplied to the windings 8b, 9b, 10b and 11b. Consequently the single phase windings 8a, 9a, 10a and 11a in the director operate as secondary windings in which are induced single phase voltages having the same phase and frequency as the voltage of the supply source 16 and each having a magnitude which is dependent upon the angular relation between the coil axes of the primary winding of a rotary induction device in the position indicator and the secondary winding of its corresponding rotary induction device in the director.

A rotary induction device in the director is considered to be in correspondence with its corresponding induction device in the position indicator when the output voltage is zero and thus output voltage has a specific phase relation to that of the alternating line voltage for deviations from correspondence in a specified direction. For example, when the primary winding 12a and the secondary winding 8a are in correspondence zero voltage is induced in winding 8a. In this connection, the windings 8a and 12a are considered to be in correspondence when the axis of the winding 8a is perpendicular to the axis of the magnetic field produced by winding 8b. On the other hand, when the axes of windings 8a and 12a are 90 degrees out of correspondence, the voltage induced in secondary winding 8a is a maximum, and when 180 degrees out of correspondence, the voltage is again zero. In other words, for intermediate positions between correspondence and 180° out of correspondence the amplitude of the alternating voltage induced in the secondary winding 8a varies sinusoidally and reverses in phase at the 180° position.

The rotor member of rotary induction device 12 in the position indicator is mechanically connected to the rotor member of the rotary induction device 13 through gearing 17 having a suitable ratio such as 10:1 so that the rotor of device 13 makes 10 complete turns for each turn of the rotor member of device 12. Similarly, between the rotor induction devices 13 and 14 and between rotary induction devices 14 and 15 are connected gearings 18 and 19 respectively each having a suitable ratio such as 10:1, i. e., the rotor member of device 14 makes 10 complete turns for each turn of the rotor of device 13 and the rotor member of device 15 makes 10 complete turns for each turn of device 14. Thus it is seen that for each turn of the 1-speed induction device 12, the induction devices 13, 14 and 15 make 10, 100 and 1,000 turns respectively. Hence they are conveniently referred to as the 1-speed, 10-speed, 100-speed and 1,000-speed induction devices respectively. In a similar manner, the rotor members of the rotary induction devices 8, 9, 10 and 11 of the director are connected together by gearings 17a, 18a and 19a having the same ratio as the gearings 17, 18 and 19 of the position indicator.

The rotor member of the 1,000-speed rotary induction device is connected to the driven table 1 through reduction gearing 20 having a suitable ratio e. g. a ratio such that the rotor member of device 15 makes 1 complete turn for each 1 inch of travel of the table 1 along its leadscrew 21. From the foregoing, it will be seen that the rotors of induction devices 14, 13 and 12 will each make one complete turn for each 10", 100" and 1,000" respectively of movement of the table or 180° of rotation for each 5", 50" and 500" respectively of movement of the table.

In order that the rotor 2 may be energized to drive table 1 in the desired direction, the voltages induced in the windings 8a, 9a, 10a and 11a, after suitable modification by electronic means, are utilized to control the energization of the thyratrons 4 and 5 from which the motor 2 is supplied. Since the phase of the voltage induced in the secondary winding of each of the induction devices in the director becomes reversed when the angular disagreement between the rotor of such induction device and that of its counterpart in the position indicator exceeds 180°, the zone within which each of the 1-speed, 10-speed, 100-speed and 1,000-speed systems exerts control over the speed and direction of rotation of the motor must be limited to less than 180°. Accordingly, provision is made for transferring control from each of the higher speed systems to the next lower speed system within such 180° zone, i. e., at a point at which the departure from correspondence of a rotary induction device in the director and its counterpart in the position indicator is less than 180°. More specifically, as the angular disagreement, usually referred to as the "error" between the 1,000-speed induction device 15 in the indicator and the 1,000-speed induction device in the director approaches 180°, control of the follow-up motor is transferred to the 100-speed system comprising induction devices 10 and 14. Similarly, when the error between the induction devices of the 100-speed system approaches 180°, control is transferred to the 10-speed system comprising induction devices 9 and 13 and finally when the error between the 10-speed system induction devices approaches the 180° limit, control of motor 2 is transferred to the 1-speed system comprising induction devices 8 and 12. As previously pointed out, the ratio of the gearing between the 1-speed induction device 12 and the table 1 is such that it rotates 180° for 500" movement of the table 1. It is assumed for the purpose of this disclosure that the maximum travel of table 1 is 250". Consequently, the error between induction devices 8 and 12 of the 1-speed system never closely approaches 180°.

For effecting transfer of control selectively and successively between the 1,000-speed, 100-speed, 10-speed and the 1-speed systems, a voltage mixing and take-over circuit 22 is provided which comprises a network array of fixed or linear resistors and voltage sensitive non-linear resistors.

An important part of this network is a plurality of variable ratio voltage dividers connected end to end in succession and each comprising a fixed linear resistor and a non-linear resistor connected in series. Specifically, the first in the succession of these variable ratio voltage dividers comprises a fixed resistor 23 and a non-linear resistance 24; the second in the succession comprises two sections 25a and 25b of a fixed resistor and a non-linear resistor 26, and the third comprises two sections 27a and 27b of a fixed resistor and a non-linear resistor 28. Corresponding terminals of the secondary windings 8a, 9a, 10a and 11a are connected to each other by the common conductor 29 and their opposite terminals are connected to selected terminal points of the variable ratio voltage dividers.

As shown, the opposite or non-common terminals of windings 8a, 9a, 10a and 11a are respectively connected to terminals 28a, 26a, 24a and 23a of the variable ratio voltage dividers. The terminals 28a, 26a, 24a and 23a serve as input terminals to the succession of voltage dividers.

Cooperating with the succession of voltage dividers 23a–28a is a voltage transfer circuit which comprises a plurality of linear resistors 30, 31 and 32 connected in series relationship between tap 23b of the first divider and output terminal 33. Between the tap 25c of the second of the voltage dividers and intermediate point 30a of the voltage transfer circuit a linear resistor 34 and a non-linear resistor 35 are connected in series relationship and between point 30a and common conductor 29 is connected a linear resistor 36. Also between conductor 29 and intermediate point 31a is connected a fixed linear resistor 37 and between the same point and tap 27c of the third divider in the succession is connected a non-linear resistor 38. Between tap 23b of the first divider and common conductor 29 is connected a series combination of a fixed resistor 39 and a non-linear resistor 40. In parallel with non-linear resistor 24 of the first divider is connected a linear resistor 41.

Since voltages are supplied by the secondary windings 11a, 10a, 9a and 8a between common conductor 29 and terminals 23a, 24a, 26a and 28a, the conductor 29 and such terminals may be considered to be the input of the take-over network and since the voltage which appears across conductor 29 and terminal 33 is utilized as a signal voltage to control the motor 2, these two terminals are considered to be the output terminals of the network. A fixed resistor 43 is connected across these terminals and is usually referred to as the output resistor.

Although the non-linear resistors 24, 26, 28, 28b, 35, 38 and 40 may be of any suitable type and may be made of any suitable material, they are preferably made of a composition of silicon carbide crystals held together by a suitable binder. Such non-linear resistance material is sold on the market under the trade mark Thyrite and it is described in U. S. Patent 1,832,742 to Karl B. McEachron, dated December 8, 1931.

To a considerable extent, the selection of the linear and non-linear resistors in the voltage mixing and take-over network depends upon the magnitude of the input voltage. It is advisable to select non-linear resistors of which the resistance undergoes great changes in the region of the input voltages used. The limits of useful voltage which can be applied to Thyrite non-linear resistors is determined by the maximum voltage at which resistors attain their rated heat dissitation and the minimum voltage below which the non-linear characteristics are very substantially less pronounced.

Although the invention is not limited thereto, the values of linear resistors indicated in the following table have been found to produce satisfactory results.

*Linear resistors*

| Resistor: | Megohms |
|---|---|
| 23 | 1.0 |
| 25a | .03 |
| 25b | .02 |
| 27a | .03 |
| 27b | .02 |
| 30 | 3.3 |
| 31 | 1.0 |
| 32 | 1.0 |
| 34 | .3 |
| 36 | 2.2 |
| 37 | 2.2 |
| 39 | .1 |
| 41 | 1.0 |
| 43 | 2.2 |

The range of peak values of input voltage for the rotary induction devices selected varies from 0 to 80 volts. Accordingly, non-linear resistors are selected whose resistance undergoes great changes in the region 0 to 80 volts. Thyrite non-linear resistors G. E. Cat. 8386118G2 were found to meet the requirements and to produce satisfactory results. However, any other suitable type of non-linear resistor could be used. The non-linear resistors used in connection with the linear resistors in the foregoing list have approximately the following voltage drop v. ohmic resistance characteristics.

*Non-linear resistors*

| Voltage Drop Across Non-Linear Resistor | Ohmic Resistance of Non-Linear Resistor, megohms |
|---|---|
| 4.0 | 10 |
| 10.0 | 1 |
| 20.0 | 0.1 |
| 37.0 | 0.01 |

The limiting ohmic resistance values of non-linear resistors can be controlled by connecting linear resistors in parallel or in series with the non-linear resistors. For example the connection of linear resistors 39 and non-linear resistor 40 in series between the tap 23b and conductor 29 causes the minimum resistance of this path to approach the resistance of the linear resistor 39, since with increasing voltage across the series connection the resistance of the non-linear resistance attains rapidly decreasing values as shown in the foregoing table of non-linear resistor. On the other hand when a non-linear resistor and a linear resistor are connected in parallel the maximum resistance of the parallel combination is limited by the fixed resistor. For example the maximum resistance of the parallel combination of non-linear resistor 24 and linear resistor 41 is limited by the linear resistor since with decreasing voltage between points 23b and 24a the non-linear resistor 24 attains rapidly increasing values.

Figure 2:
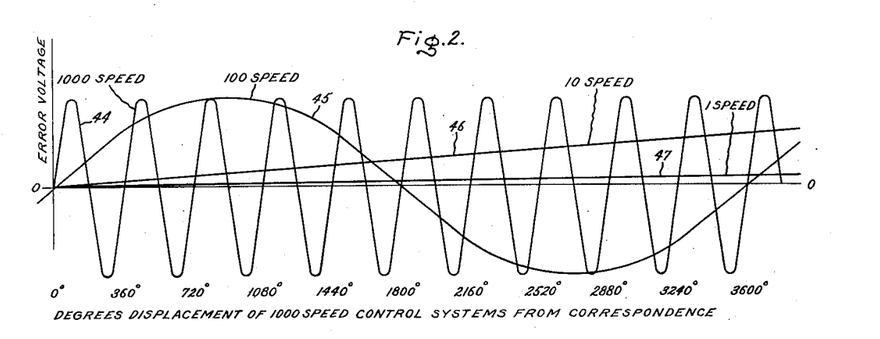
Fig. 2 is a chart of characteristic curves which facilitates an understanding of the operations of the follow-up control system of Fig. 1.

An understanding of the manner in which the take-over network operates selectively to transfer control of the motor 2 from a higher speed control system to the next lower speed system as the error of the high speed system approaches 180° is facilitated by the chart of characteristic curves in Fig. 2 in which abscissae represent displacement in angular degrees of the 1,000-speed control system and ordinates represent error voltage i. e. the voltages induced in the secondary windings 8a, 9a, 10a and 11a. The envelope of the maximum amplitudes of error voltage of the 1,000-speed system is represented by the sinusoidal curve 44. This curve indicates that such envelope varies sinusoidally between zero and maximum values with increasing angular displacement of the rotor winding 11a of the director from correspondence with winding 15a in the position indicator. Negative values of this envelope indicate a reversal in phase of the voltage induced in the winding 11a with respect to the voltage of the source 16 from which the primary windings 12a, 13a, 14a and 15a in the position indicator are supplied. Since a phase reversal of the voltage induced in winding 11a would produce unwanted reversal in the direction of rotation of the motor 2, the control of such motor must be transferred to the 100-speed control system before the angular error between winding 11a and 15a attains a value of 180°. Such transfer is affected by the non-linear error signal take-over network 22.

In Fig. 2, the envelope of maximum amplitudes of error voltage of the 100-speed system is represented by the curve 45. As indicated by this curve, the envelope varies sinusoidally between zero and maximum values with increase of angular displacement of rotor winding 10a in the director from correspondence with rotor winding 14a in the position indicator. Negative values of the curve 45 indicate that the phase of the voltage of line frequency which is induced in winding 10a is reversed in respect to that of the source 16. Since such phase reversal would effect reversal of the motor 2, control must be taken away from the 100-speed system prior to the 180° error point and transferred to the 10-speed system.

Similar considerations apply to the 10-speed system of which the envelope of maximum amplitudes of the error voltage is represented by the curve 46. Like the curves 44 and 45, curve 46 is a sinusoid. However, owing to the scale employed in Fig. 2, only the first 36° of this curve is illustrated. This amount corresponds to 3600° of the 1,000-speed system. Before phase reversal of the voltage induced in rotor winding 9a takes place, control of the motor 2 must be taken away from the 10-speed system and transferred to the 1-speed system of which the envelope of maximum amplitudes of its output voltage is represented by curve 47. Because of the scale employed, only the first 3.6° of this curve is illustrated in Fig. 2.

Figure 3:
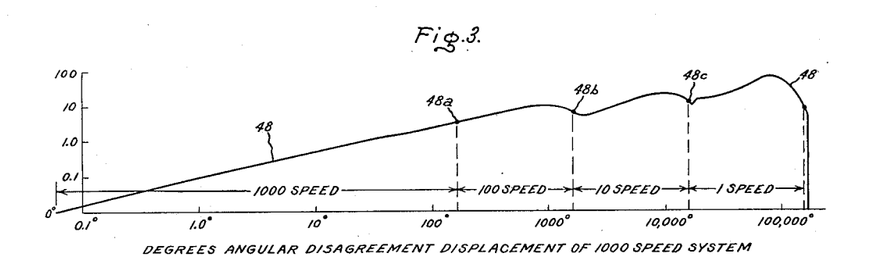
Fig. 3 is a plot on logarithmic scale of the output voltage v. error or departure of the system from corresponding

An understanding of the operation of the take-over circuit 22 to transfer control between higher and lower speed control systems will be facilitated with reference to its output voltage v. degrees angular displacement of the 1,000-speed system characteristic which is represented by the curve 48 in Fig. 3. This curve is also an envelope of the maximum amplitudes of the actual alternating voltage of line frequency. In order to illustrate the shape of the curve 48 throughout substantially the entire range of 180° of the low speed system or 180,000° of the 1,000-speed system, it is plotted in logarithmic coordinates. The condition of correspondence i. e. zero error between the rotor windings of the director 6 and the position indicator 7 of the 1, 10, 100 and 1,000 speed systems is indicated by the intersection of curves 44, 45, 46 and 47 at the zero degree origin of coordinates in Fig. 2. In other words, at zero error, zero voltage is induced in each of the rotor windings 8a, 9a, 10a and 11a. Consequently, at correspondence the output voltage of the take-over network at terminals 29 and 33 is also zero as indicated by the zero ordinate curve of curve 48 in Fig. 3. With increasing angular displacement between the rotors in the directors and the rotors in the position indicators, voltages of which the envelopes of their maximum amplitudes are represented by curves 44, 45, 46 and 47 are induced in windings 11a, 10a, 9a and 8a. At very low voltages, the individual resistances of all the non-linear resistors 24, 26, 28, 28b, 35, 38 and 40 are extremely high, e. g., in excess of 10 megohms. Under these conditions, it may be assumed the resistances of the non-linear resistors are infinite and that the output voltage is a function of the fixed resistors of the circuit. For small errors in correspondence, the voltage supplied from the take-over circuit by the 1,000-speed system greatly exceeds the voltages supplied by the others and dominates in the production of the output voltage as illustrated by the portion of the output voltage curve between zero and the point 48a. More specifically, in the first 20° angular disagreement or error in the 1,000-speed system the polarity of the voltages supplied from windings 8a, 9a, 10a and 11a to take-over network is the same. The actual magnitudes of these voltages increases from one control induction device to the next by 10:1 ratios as indicated by magnitudes of curves 44, 45, 46 and 47 on any abscissa in the first 20° of the 1,000-speed system. Since at very low voltages, the resistances of the non-linear resistors are extremely high, the voltages of the 100-speed, 10-speed and 1-speed induction devices which reach the output terminals 29 and 33 principally through such non-linear resistors are greatly reduced or suppressed. However, the voltage of the 1,000-speed induction device does not have to pass through non-linear resistors and consequently it reaches the output terminals without excessive diminution and thus is dominant in this region.

In the region of 20° to 164°, the voltage of the 1,000-speed device becomes quite large. However, the voltage of point 23b is very substantially limited with respect to the voltage of common terminal 29 by the decreasing resistance of non-linear resistor 40 and is also limited with respect to the voltage of the 100-speed transformer at the point 24a by the decrease in resistance of non-linear resistor 24. As a result of the limiting effect of non-linear resistors 24 and 40 and the voltage dropping effect of linear resistors 30, 31 and 32 the voltage which reaches the output terminal 33 by this path is very considerably less than the voltage of the winding 11a at point 23a. A further limitation is imposed on the voltage of output terminal 33 at appreciable voltages in the 0° to 164° range as a result of parallel connections of the non-linear resistors 35, 38 and 28b between intermediate points on the succession of voltage dividers and the output. The net effect of this is to prevent the 1,000-speed device from supplying its full peak value to the output terminals. In this zone, the voltages of the 10-speed and 1-speed rotary induction devices are of such low value that the non-linear resistor 38 and 28b continue to impose a substantial limiting effect on the portions of their voltages which reach the output terminals. For all practical purposes, their voltages, in this zone, do not contribute any appreciable or significant effect to the output voltage. With respect to the 100-speed rotary induction device, the situation is slightly different. As the voltage at the point 24a rises, it approaches more closely to the voltage of point 23b. Connecting these two points is a voltage divider which comprises linear resistors 25a, 34, non-linear resistor 35 and linear resistor 30. With decreasing voltage across the divider, the resistance of the non-linear resistor 35 increases. Consequently, in this zone 20° to 164°, the 100-speed system is making a contribution to the output voltage but its effect is considerably less than dominant.

At 164° angular disagreement of the 1,000-speed system, the voltage of the 1,000-speed induction device in accordance with its sinusoidal characteristic, is fading rapidly. In this region of 164° to 360° as seen in Fig. 2, the voltage of the 1,000-speed device becomes less than that of the 100-speed rotary induction device to produce an increase of reverse polarity in the voltage between points 23a and 24a. In response to this increase, the resistance of non-linear resistor 24 decreases and thereby limits the voltage at point 23b closely to the value of the 100-speed rotary induction device at the point 24a.

Slightly prior to the instant at which the voltages at points 23a and 24a become equal, the voltage at point 24a becomes equal to the voltage at point 30a. Owing to the resulting high resistance of non-linear resistor 35, its effect on the voltage at point 30a changes from limiting to aiding and thus assists the rise of voltage at point 30a. Practically the full value of voltage between points 23a and 24a appears across non-linear resistor 35. Consequently, the voltage at 30a is boosted instead of being allowed to decrease as might be expected from the rapid approach of the voltage at point 23a to zero and negative values. Thus the effect of the 1,000-speed induction devices changes from one of dominance to complete loss of control and consequently control of the motor 2 has been transferred from the 1,000-system to the 100-speed system. The point at which this take-over occurs is represented in Fig. 3 by the point 48a. With further increases in the error, the voltage induced in the winding 11a of the 1,000-speed system decreased rapidly to zero and again increases in amplitude but in reverse phase. As its phase reverses, the non-linear resistors operate to limit the amount thereof which appears at the output terminals of the take-over network.

Beyond the point at which the error voltage of the 1,000-speed system becomes zero going negative as illustrated by curves 44 and 45 in Fig. 2, the voltage of the 100-speed system rises steadily thereby to decrease the resistance of non-linear resistor 35 and correspondingly increase the voltage at point 30a and consequently at the output terminal 33. This continues to the 360° error point of the 1,000-speed system.

In the zone between 360° and 1640° error of the 1,000-speed system, i. e. 164° error in the 100-speed system, the voltage of the 100-speed system is large, and owing to the now-aiding effect of the non-linear resistor 35 on the voltage of the 100-speed induction device which is supplied to the output terminal 33, the successive negative excursions of the 1,000-speed system voltage have no significant effect. The positive excursions of the 1,000-speed system voltage are in the correct direction to aid; but, because its effect is limited by the non-linear resistor 24, it does not on such subsequent positive excursions regain dominance.

At 1640° error of the 1,000-speed system, which point is represented by point 48b of curve 48 in Fig. 3, the voltage of the 10-speed system exceeds the voltage of the point 31a and control of the motor 2 is transferred to the 10-speed system in a manner similar to the transfer of control from the 1,000-speed system to the 100-speed system previously described. From the foregoing, it is seen that in the zone between 164° and 1640° error of the high speed system, i. e. between the point 48a and the point 48b of curve 48, the voltage of the 100-speed system which is larger than the voltages of the 10-speed and 1-speed systems is dominant in determining the output voltage characteristic and the 100-speed system has control of motor 2.

Further increase in the error beyond 1640° error of the high speed system causes the voltage of the 100-speed system to decrease to zero and subsequently to increase but in reverse phase. As before, the non-linear resistors of the take-over circuit are affected to limit to a negligible value the amount of reverse phase voltage induced in the secondary winding 10a which apears at the output terminals of the take-over circuit and consequently the voltage of the 10-speed system is dominant in determining the characteristic of the output in the region between points 48b and 48c and in exerting control over motor 2. Similar considerations apply with respect to the transfer from the 10-speed system to the 1-speed system.

Thus with increasing error, there is produced at the output terminals of the take-over network an alternating error voltage of which the envelopes of the maximum amplitudes of the individual cycles of line frequency is represented by curve 48.

This alternating error voltage is amplified by means of a twin triode cathode coupled amplifier valve 49. Preferably, this valve is a 6SN7GT high vacuum valve; although other types of amplifier valves may be employed if desired. The output voltage of the amplifier appears at the anodes 49a and 49b and through a transformer 50 of which the primary winding is connected across anodes 49a and 49b, the amplified error voltage is supplied to the anode-cathode circuits of an electric valve-type discriminator 51 having a single-ended output. Preferably, this discriminator comprises two twin triode high vacuum valves 52 and 53. The anodes 52a and 53a of these valves are connected to opposite terminals of the secondary winding 50b and their cathodes are connected in common to its center tap through resistors 54 and 55. Similarly, the anodes 52b and 53b are connected to opposite terminals of the secondary winding 50c of which the center tap is connected through resistors 56 and 54 to the cathodes 52c and 53c.

To the input control circuits of both valves 52 and 53 are supplied alternating voltages of the same frequency and phase as that of the voltages which are supplied to the anodes. In this connection, the control electrodes 52d and 53d are connected to opposite terminals of the secondary winding 57b of a transformer 57 of which the primary winding 57a is connected across the alternating voltage supply conductor 16. Its centertap is connected through resistor 55 to the cathodes 52c and 53c. Similarly, the control electrodes 52e and 53e are connected to opposite terminals of a second secondary winding 57c of which the centertap is connected through resistor 56 to cathodes 52f and 53f.

Briefly, the operation of the discriminator is as follows: In the condition of correspondence between rotor windings 12a, 13a, 14a and 15a of the position indicator and the corresponding rotor windings 8a, 9a, 10a and 11a respectively in the director, zero voltage is supplied to the take-over network and zero voltage is likewise supplied to the amplifier 49 and to the anode circuits of the discriminator. Consequently, the valves 52 and 53 do not conduct and the voltage across the resistor 54 is zero. Any error, i. e. angular disagreement of the rotor windings of the position indicator with the rotor windings of the director results in supplying to the take-over network an A. C. error voltage. This voltage is modified in the take-over circuit in accordance with curve 48 of Fig. 3, and after amplification, it is supplied to the anodes of valves 52 and 53. For one direction of error, the voltage supplied to anodes 52a and 53a will be in phase with the voltage supplied to the control electrodes 52e and 53e and the voltage supplied to anodes 52b and 53b will be 180° out-of-phase with the voltages supplied to the control electrodes 52d and 53d. Conduction will take place in the right hand conduction paths of valves 52 and 53 and the left hand valves will be non-conducting. Consequently, there will appear across the output circuit resistor 54 a direct voltage which is positive at its right hand terminal and has a value which is approximately proportional to the magnitude of the error, for small values of error.

For an error of opposite direction, a direct voltage of reverse polarity will appear across the terminals of output resistor 54. Thus there is produced across the output resistor of the discriminator a direct voltage having a polarity which corresponds to the direction of the error and a magnitude which is approximately proportional to the error for small values thereof.

The voltage across the output resistor 54 of the discriminator is supplied to the input circuit of an amplifier of the cathode follower type. This cathode follower comprises an electric valve 58 which may be any suitable type of valve such as one half of a 6SN7GT high vacuum valve. It is supplied from a suitable source of direct voltage such as represented in Fig. 1 by conductors 59, 60 and 61 which provide three different levels of voltage. The voltage of supply conductor 61 may be considered to be at ground or zero potential; that of conductor 60 to be 100 volts positive with respect to ground and that of conductor 59 to be 300 volts positive with respect to ground. The anode 58a of cathode follower valve 58 is connected to the 300-volt supply conductor 59 and its cathode 58b and its cathode 58b is connected through cathode resistors 62 and 63 to the zero voltage supply conductor. To the input or control electrode circuit of the cathode follower valve is supplied the output voltage of the discriminator. This cathode follower input circuit includes the discriminator output resistor 54 and is traced from control electrode 58c through resistors 64, 65 and 66 discriminator output resistor 54 to the 100-volt supply conductor 60. In operation, the voltage of the cathode closely follows the voltage of the control electrode, trailing behind it just sufficiently to produce the change in control electrode to cathode voltage necessary to effect the desired change in cathode current. The output voltage may be derived from across the total output resistor or from across from any selected portion of it. In the illustrated embodiment, the voltage across the cathode resistor 63 is utilized as the output voltage and is supplied to the input circuit of an amplifier stage of the reversing motor control circuit 3. This amplifier is illustrated as comprising a pair of matched electric valves such as the twin triode electric valve 67 of which the anodes 67a and 67b are connected through equal resistors 68 and 69 to the 300-volt positive supply conductor 59, and cathodes 67c and 67d are connected through a common resistor 70 of high value to the zero voltage supply conductor 61. To the 100-volt supply terminals 60 is conected the control electrode 67e of the left-hand conducting path whereas the control electrode 67f of the right hand conducting path is connected to the common terminal 63a of cathode resistors 62 and 63 of the cathode follower so that the output voltage across resistor 63 is supplied to the input circuit of the cathode coupled amplifier 67. The voltage across the anodes 67a and 67b is utilized as the output voltage of the amplifier and is supplied to the input control circuits of the forward and reverse thyratrons 4 and 5.

Following is a short description of the operation of the cathode-coupled amplifier 67. As long as the voltages of both control electrodes 67e and 67f are equal, the voltages of both anodes are equal and consequently equal voltages of opposite polarities are supplied to the input circuits of thyratrons 4 and 5. However, if the voltage of the control electrode for one conducting path varies slightly with respect to the voltage of the other, current of the first conducting path as well as the RI drop in the common cathode resistor changes and this produces a change in the opposite sense in the current in the other conducting path. For example, assume that the voltage of control electrode 67f becomes more negative. Current in the right hand conducting path decreases correspondingly thereby effecting a decrease in the voltage across the cathode resistor 70 and lowering the voltage of the cathode to a value closer to the fixed voltage of control electrode 67e. This increases the current in the left hand conducting path substantially to restore the original total cathode current, i. e. to restore the sum of the currents flowing in both conducting paths to its original value.

Voltage is supplied to the armature of the table drive motor 2 from the secondary winding 71b of a transformer 71 to the terminals of which secondary winding the armature is connected through the thyratrons 4 and 5 which are reversely connected in parallel, i. e. the anode 4a and cathode 5b are connected to one terminal and the anode 5a and cathode 4b are connected to the opposite terminal. As shown, the primary winding 71a is connected to the supply terminal 16.

The anode 67a of the cathode-coupled amplifier is connected to the input control circuit of thyratron 4 and included in this connection is a static phase shift bridge network of which a resistor 72, a capacitor 73 and opposite halves of the secondary winding 71c of supply transformer 71 constitute the arms. As a result of this connection, there is supplied to the input circuit of thyratron 4 a resultant voltage having an alternating component which is de-phased with respect to its anode voltage and a direct component which is variable in magnitude, and a function of the difference between the error voltage output of the cathode follower and the counter voltage of the motor. The effect of variation of the resultant voltage on the conduction of the thyratron is to vary its firing point in each positive half cycle of its anode voltage in accordance with variations in the magnitude of the direct component. A similar static phase shift network 74 is connected between the input control circuit of thyratron 5 and the anode 67b of the cathode-coupled amplifier.

In the balanced condition of the system, i. e. when the rotors of the rotary induction devices 12, 13, 14 and 15 in the position indicator are in correspondence with their counterparts 8, 9, 10 and 11 in the director, the voltage across the resistor 54 of the discriminator is zero. Consequently, the voltage of the terminal 63a in the cathode follower circuit will have a value such that both halves of the cathode-coupled twin triode 67 are conducting equal amounts of current and approximately in mid range. Such equal conduction of both halves of valve 67 produces at the anodes 67a and 67b equal voltages of such magnitude that the thyratrons 4 and 5 supply in opposite directions to the armature of the motor equal but relatively small amounts of current with the result that the motor is held at standstill.

If the rotary induction devices of the position indicator are not in correspondence with their counterparts in the director an error is said to exist, and as previously explained, an error voltage appears across the output resistor 54 of the discriminator. Assuming that with angular disagreement in a direction designated as the forward direction, the error voltage is positive at terminal 54a, the current conducted by the cathode follower 58 increases thereby making the voltage at point 63a more positive. This results in increasing the current conducted in the right hand path of valve 67 and decreasing it in the left hand path thereby to make the voltage of anode 67a more positive than the voltage of anode 67b. The more positive voltage at anode 67a advances the firing point of forward thyratron 4 thereby causing it to supply to the armature of the motor 2 an increased amount of current. Conversely, the more negative voltage of anode 67b retards the firing point of reverse thyratron 5 causing it to cease conduction entirely. As a result, the motor rotates in a forward direction thereby rotating the rotors of the rotary induction devices in the position indicator toward correspondence with their counterparts in the director. Simultaneously, it drives the table 1 in a forward direction. Upon arrival of the rotors of the position indicator in correspondence with the rotors in the director, the output voltages of the windings 8a, 9a, 10a and 11a become zero. Likewise, the voltage across the output resistor 54 of the discriminator vanishes and as a result, the motor 1 stops and the table is brought to rest in a position corresponding to the angular positions of the rotors of the control transformers of the director.

If the original angular disagreement of the rotors of the position indicator and those of the director had been in the reverse direction, the polarity of the error voltage which appeared across the output resistor 54 of the discriminator would have been reversed. In consequence, the motor 2 would have been energized for rotation in the reverse direction to drive the rotors of the posion indicator toward correspondence with the rotors of the director and the table would have been driven in the reverse direction and brought to standstill in a new position.

The operation will be more completely understood from the following detailed description of an actual operation in which it is assumed that the table 1 is to be moved to a position which is a predetermined distance, e. g., 235.164" from an initial position. Since the 1,000-speed rotary induction device 15 in the position indicator is geared to the table 1 through gearing which causes it to make one complete rotation for each inch of travel of the table, it will make 235 complete rotations plus .164 of a complete rotation while the table is moving 235.164". In other words, its rotor will come to rest in a final angular position which is displaced from a predetermined initial position .164×360° or 59.04°. By similar calculation, it is seen that for a 235.164" movement of the table from such predetermined initial position, rotary induction devices 12, 13, 14 and 15 must come to rest in final positions angularly displaced from such predetermined initial positions as shown in the following Table I.

TABLE I

| Control Transformers | 12 | 13 | 14 | 15 |
|---|---|---|---|---|
| Final angular displacement for initial position for 235.164" displacement of position | 84.65904 | 126.5904 | 185.904 | 59.04 |

If the table 1 is to be brought to rest by action of the follow-up control system in a position 235.164" from an initial position, corresponding control transformers 8, 9, 10 and 11 in the director must be preset in the identical angular positions which the rotors of their counterparts in the position indicator occupy when the table is exactly 235.164" from such initial position. In other words, the control transformers 8, 9, 10 and 11 must be preset in the angular positions set forth in Table I for the control transformers 12, 13, 14 and 15 respectively of the position indicator. This prepositioning may be accomplished in any suitable manner. For example, it may be done manually, or it may be accomplished by means of suitable apparatus for converting numerical information on a data storage medium into angular positions of the rotors of the director transformers 8, 9, 10 and 11 such as disclosed in application Serial No. 478,632, filed December 30, 1954, Kelling and Peasley, and assigned to the assignee of the present invention.

Assuming now that the rotors 12a, 13a, 14a and 15a in the position indicator are in the positions which they occupied at the completion of the immediately preceding movement of the table, voltages are induced in the windings 8a, 9a, 10a and 11a in the director and such induced voltages are supplied to the take-over network 22. The voltage at the output terminals 29 and 33 of the take-over network is utilized in the manner previously described to energize the motor 2 for rotation at full speed in the appropriate direction to drive the table toward a position 235.164" from the predetermined initial position.

As the table arrives within approximately 45" of its final position, i. e., 16400° error of the 1,000-speed system, the rotor of the 1-speed control transformer in the position indicator arrives within approximately 16.4° of correspondence with the 1-speed device 8 in the director. Consequently, as can be extrapolated from curve 47 of Fig. 2, the voltage induced in winding 8a decreases to a value at which it ceases to be a dominant factor in the output voltage of the take-over network. However, from this point until the table arrives at a point within approximately 4.5" of its final position, the voltage induced in the secondary winding of the 10-speed control transformer 9 is the dominant factor in the output voltage and controls the energization of the follow-up motor 2. In a similar manner, control of the motor 2 is transferred from the 10-speed system to the 100-speed system and from the 100-speed system to the 1,000-speed system as the rotors 13a and 14a of position indicators successively arrive within approximately 16.4 degrees of correspondence with the rotors 9a and 10a respectively in the directors. As the rotor of the 1,000-speed device in the position indicator arrives within approximately 16.4 degrees of correspondence with the rotor of the 1,000-speed device in the director, the voltage induced in winding 11a decreases to such a low value that the phase of the voltage applied to the input circuit of the active thyratron (assumed to be the forward thyratron 4) is retarded and the speed of the motor is correspondingly decelerated. Coincidentally with the arrival of table 1 at a position 235.164" from its predetermined initial position each of the rotors 12a, 13a, 14a and 15a of the position indicator is in correspondence with its counterpart 8a, 9a, 10a or 11a in the director. As a result, zero voltage is induced in windings 8a, 9a, 10a and 11a and the phase of the voltage supplied to the input circuit of forward thyratron 4 is retarded to the point at which forward thyratron 4 reverse thyratron 5 supply small but equal amounts of current in opposite directions of the armature of the motor. As a result, the motor 2 is brought to rest with the table exactly 235.164" from the predetermined initial position.

Figure 4:
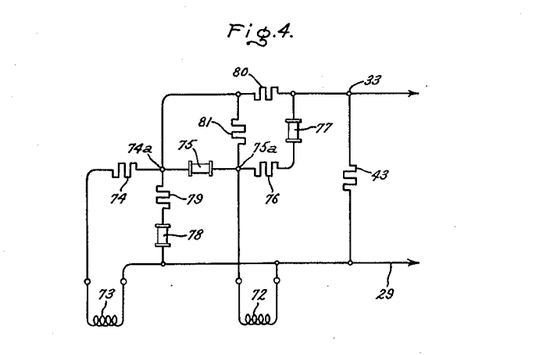
Fig. 4 is a simple diagrammatic sketch of a modification of the control system of Fig. 1.

For applications not requiring 4 stages of refinement of the accuracy of control, the follow-up control system of Fig. 1 may be modified to provide a lesser number. For example, by omitting the 1,000-speed control system and the 100-speed control system it may be modified to provide for the control of the motor by a relatively coarse 1-speed control system and a relatively fine 10-speed control system. Additionally, the voltage mixing and take-over circuit of Fig. 1 is suitably modified. Such modified take-over network is illustrated in Fig. 4 in which the windings 72 and 73 are the secondary windings of the 1-speed and 10-speed rotary induction devices respectively of the director. They correspond to the windings 8a and 9a respectively of the 1-speed and 10-speed induction devices in Fig. 1. Corresponding terminals of both windings are connected to the common terminal 29. Across their opposite or non-common terminals is connected a variable ratio voltage divider which comprises linear and non-linear resistors. In this connection, the voltage divider comprises a linear resistor 74 and a non-linear resistor 75. A linear resistor 76 and a non-linear resistor 77 are connected in series between input terminal 75a and output terminal 33 of the network. Between the common terminal 29 and the common point 74a between linear resistor 74 and non-linear resistor 75 is connected a variable ratio voltage divider which comprises non-linear resistor 78 and linear resistor 79. A voltage transfer linear resistor 80 is connected between tap 74a and output terminal 33, and in parallel with non-linear resistor 75 is connected a linear resistor 81. The resistor 43 is connected across the output terminal 29 and serves as the output circuit resistor.

In selecting resistors for the network of Fig. 4, the same general considerations apply as previously set forth in connection with the take-over network of Fig. 1. For the network of Fig. 4, the resistance values for the linear resistors set forth in the following table will produce satisfactory results.

| Resistor: | Megohms |
|---|---|
| 43 | 2.2 |
| 74 | 1.0 |
| 76 | .3 |
| 79 | .1 |
| 80 | 3.3 |
| 81 | 1.0 |

The non-linear resistors 75, 77 and 78 are preferably the same as the Thyrite resistors used in the modification of Fig. 1.

The operation of the follow-up control system with the modified voltage mixing and take-over circuit of Fig. 4 will be readily understood from the detailed description of the system of Fig. 1.

Although in accordance with the provisions of the patent statutes, this invention has been described as embodied in concrete form and the principle thereof has been explained together with the best mode in which it is now contemplated applying that principle, it will be understood that the elements shown and described are merely illustrative and the invention is not limited thereto since alterations and modifications will readily occur to persons skilled in the art without departing from the true spirit of the invention or from the scope of the annexed claims.

What I claim as new and desire to secure by Letters Patent of the United States is:

1. A voltage mixing and take-over network comprising a pair of output terminals, a succession of pairs of input terminals, a common connection between one of said output terminals and one of each of said pairs of input terminals, a variable ratio voltage divider connected between a pair of successive non-common input terminals comprising a linear resistor and a non-linear resistor connected in series, and a linear resistance voltage transfer circuit connected between a tap on said divider and said non-common output terminal.

2. A voltage mixing and take-over network comprising a pair of output terminals, a succession of pairs of input terminals, a common connection between one of said output terminals and one of each of said pairs of input terminals, a succession of variable ratio voltage dividers each connected between a different pair of successive non-common input terminals and each comprising a linear resistor and a non-linear resistor connected in series, a linear resistance voltage transfer circuit connected between a tap on the first of said voltage dividers in said succession and the non-common output terminal and a resistive connection from said common output terminal to a tap on one of said dividers.

3. A voltage mixing and take-over network comprising first and second output terminals, a succession of pairs of input terminals, a common connection between said first output terminal and one of each of said pairs of input terminals, a variable ratio voltage divider connected between a pair of successive non-common input terminals comprising a linear resistor and a non-linear resistor connected in series, a linear resistance voltage transfer circuit connected between a tap on said divider and said second output terminal, and a connection including a non-linear resistor from said first output terminal to a tap on said divider.

4. A voltage mixing and take-over network comprising first and second output terminals, a succession of pairs of input terminals, a common connection between said first output terminal and one of each of said pairs of input terminals, a variable ratio voltage divider connected between a pair of successive non-common input terminals comprising a linear resistor and a non-linear resistor connected in series, a voltage transfer resistor connected between a tap on said divider and said second output terminal a third linear resistor connected in parallel with said non-linear resistor, and a fourth linear resistor connected from said first output terminal to said second output terminal.

5. A voltage mixing and take-over network comprising first and second output voltage terminals, a succession of pairs of input terminals, a common connection between said first output terminal and one of each of said pairs of input terminals, a succession of variable ratio voltage dividers each connected between a pair of successive non-common input terminals and each comprising a linear resistor and a non-linear resistor connected in series, a voltage transfer circuit comprising a linear resistor connected between a tap on the first of said dividers in said succession and said second output terminal, and bridging connections from taps on said dividers to intermediate points on said voltage transfer resistor each comprising a non-linear resistor.

6. A voltage mixing and take-over network comprising first and second output terminals, a succession of pairs of input terminals, a common connection between said first output terminal and one of each of said pairs of input terminals, a variable ratio voltage divider connected between a pair of successive non-common input terminals comprising a linear resistor and a non-linear resistor connected in series, a linear resistance voltage transfer circuit connected between a tap on said divider and said second output terminal, a bridging connection from a point on said voltage divider to a point on said voltage transfer resistor comprising a non-linear resistor.

7. A voltage mixing and take-over network comprising first and second output voltage terminals, a succession of pairs of input terminals, a common connection between said first output terminal and one of each of said pairs of input terminals, a succession of variable ratio voltage dividers each connected between a pair of successive non-common input terminals and each comprising a linear resistor and a non-linear resistor connected in series, a voltage transfer circuit comprising a linear resistor connected between a tap on the first of said dividers in said succession and said second output terminal, a connection from said first output terminal to a tap on the first of said dividers in said succession comprising a non-linear resistor and bridging connections comprising non-linear resistors from taps on said dividers to intermediate points of said voltage transfer resistor.

8. A voltage mixing and take-over network comprising first and second output voltage terminals, a succession of pairs of input voltage terminals, a common connection between said first output terminal and one of each of said pairs of input terminals, a succession of variable ratio voltage dividers each connected between a pair of successive non-common input terminals and each comprising a linear resistor and a non-linear resistor connected in series, a voltage transfer circuit comprising a linear resistance connected between a tap on the first of said dividers in said succession and said second output terminal, a connection comprising a non-linear resistor for said first output terminal to a tap of said first voltage divider, bridging connections comprising non-linear resistors from taps on said dividers to intermediate points on said transfer circuit resistance and connections comprising linear resistors from said first output terminal to intermediate points on said transfer circuit resistance.

9. A voltage mixing and take-over network comprising first and second output voltage terminals, a succession of pairs of input voltage terminals, a common connection between said first output terminal and one of each of said pairs of input terminals, a succession of variable ratio voltage dividers each connected between a pair of successive non-common input terminals and each comprising a linear resistor and non-linear resistor connected in series, a voltage transfer circuit comprising a linear resistance connected between a tap on the first of said dividers in said succession and said second output terminal, a connection comprising a non-linear resistor from said first output terminal to a tap of said first voltage divider, bridging connections comprising non-linear resistors from taps on said dividers to intermediate points on said transfer circuit resistance, a linear resistor connected in parallel with said non-linear resistor of said first voltage divider and a non-linear resistor connected from the non-common terminal of the last of said pairs of input terminals in said succession to said second output terminal.

10. A follow-up control system comprising in combination, driving means, a position indicator driven by said driving means and a director providing relatively coarse and relatively fine electrical control systems for said driving means, means responsive to positional disagreement of said position indicator and said director for energizing said driving means to drive said position indicator into correspondence with said director and means responsive to the voltages of said fine and coarse control systems for transferring the control of said driving means from one to the other at the boundary between predetermined zones of operation of each comprising a pair of output terminals, a succession of pairs of input terminals, a common connection from one of said output terminals to one of each of said pairs of input terminals, a plurality of variable ratio voltage dividers connected end to end in succession each comprising a linear resistor and a non-linear resistor connected in series between different successive non-common input terminals, a connection comprising a non-linear resistor from said common output terminal to a tap on the first of said dividers in said succession, a voltage transfer circuit comprising a linear resistance connected from a tap on said first divider to said non-common output terminal and input connections from said fine and coarse control systems to corresponding pairs of input terminals in said succession.

11. A follow-up control system comprising in combination, an electric motor, a position indicator driven by said driving means and a director providing relatively coarse and relatively fine electrical control systems for said motor, means responsive to the voltages of said fine and coarse control means for transferring the control of said motor from one to the other at the boundary between predetermined zones of operation of each comprising a pair of output terminals, a succession of pairs of input terminals, a common connection from one of said output terminals to one of each of said pairs of input terminals, a plurality of variable ratio voltage dividers connected end to end in succession and each comprising a linear resistor and a non-linear resistor connected in series between different successive non-common input terminals, a voltage transfer circuit comprising a linear resistance connected from a tap on the first of said dividers in said succession to said non-common output terminal, input circuit connections from said fine and coarse control means to corresponding pairs of input terminals in said succession, and electronic amplifier means connected to said output terminals and responsive to the output voltage for controlling the energization of said motor to drive said position indicator into correspondence with said director.

12. A follow-up control system comprising in combination, an electric motor, a director comprising a pair of induction devices each having relatively movable primary and secondary windings, a position indicator having a pair of induction devices each having relatively movable primary and secondary windings, electrical connections from a winding of each of said induction devices in said director to a winding of a corresponding induction device in said position indicator, mechanical driving connections of different ratios between said motor and the movable winding of each of said induction devices in said position indicator to provide a relatively coarse and relatively fine control system for controlling said motor each comprising a different pair of corresponding induction devices in said director and position indicator, and means for transferring the control of said motor from one of said control systems to the other comprising a voltage mixing and take-over network having a pair of output voltage terminals, a succession of pairs of input terminals, a common connection from one of said output terminals to one of each of said pairs of input terminals, a variable ratio voltage divider connected between a pair of successive non-common input terminals, a connection comprising a non-linear resistor from said common output terminal to a tap on said voltage divider, a voltage transfer circuit comprising a linear resistance connected from a tap on said voltage divider to said non-common output terminal, input connections from each of said fine and coarse control systems to a corresponding pair of said input terminals, and electronic amplifier means connected to said output terminals and responsive to the output voltage for controlling said motor to drive the movable windings of said position indicator induction devices into positional correspondence with the movable windings of said director induction devices.

13. A follow-up control system comprising in combination, an electric motor, a director comprising a plurality of control induction devices each having relatively movable primary and secondary windings, a position indicator comprising a plurality of control induction devices each having relatively movable primary and secondary windings, electrical connections from a winding of each of said position indicator induction devices to a winding of a corresponding director induction device, mechanical driving connections of progressively varying ratios between said motor and the movable windings of said position indicator induction devices to provide a plurality of control systems for said motor varying in their preciseness of control from relatively coarse to relatively fine and each comprising a different pair of corresponding director and position indicator induction devices, means for progressively transferring the control of said motor from one of said systems to another at the boundaries of predetermined zones of operation of each comprising a voltage mixing and take-over network having a pair of output voltage terminals, a succession of pairs of input terminals, a common connection from one of said output terminals to one of each of said pairs of input terminals, a plurality of variable ratio voltage dividers connected end to end in succession and each comprising a linear resistor and a non-linear resistor connected in series between different successive non-common input terminals, a voltage transfer circuit comprising a non-linear resistance connected from a tap of the first voltage divider in said succession to said non-common output terminal, bridging connections comprising non-linear resistors from taps on said voltage dividers to intermediate points of said voltage transfer circuit, input connections from each of said control systems to corresponding pairs of said input terminals, and electronic amplifier and discriminator means connected to said output terminals and responsive to the voltage at said output terminals for supplying to said motor a direct voltage poled to cause said motor to drive said position indicator induction devices into correspondence with said director induction devices.

References Cited in the file of this patent
UNITED STATES PATENTS

| | | |
|---|---|---|
| 2,446,532 | Edwards | Aug. 10, 1948 |
| 2,493,772 | McCoy et al. | Jan. 10, 1950 |
| 2,614,237 | Goertz | Oct. 14, 1952 |